United States Patent Office 3,846,304
Patented Nov. 5, 1974

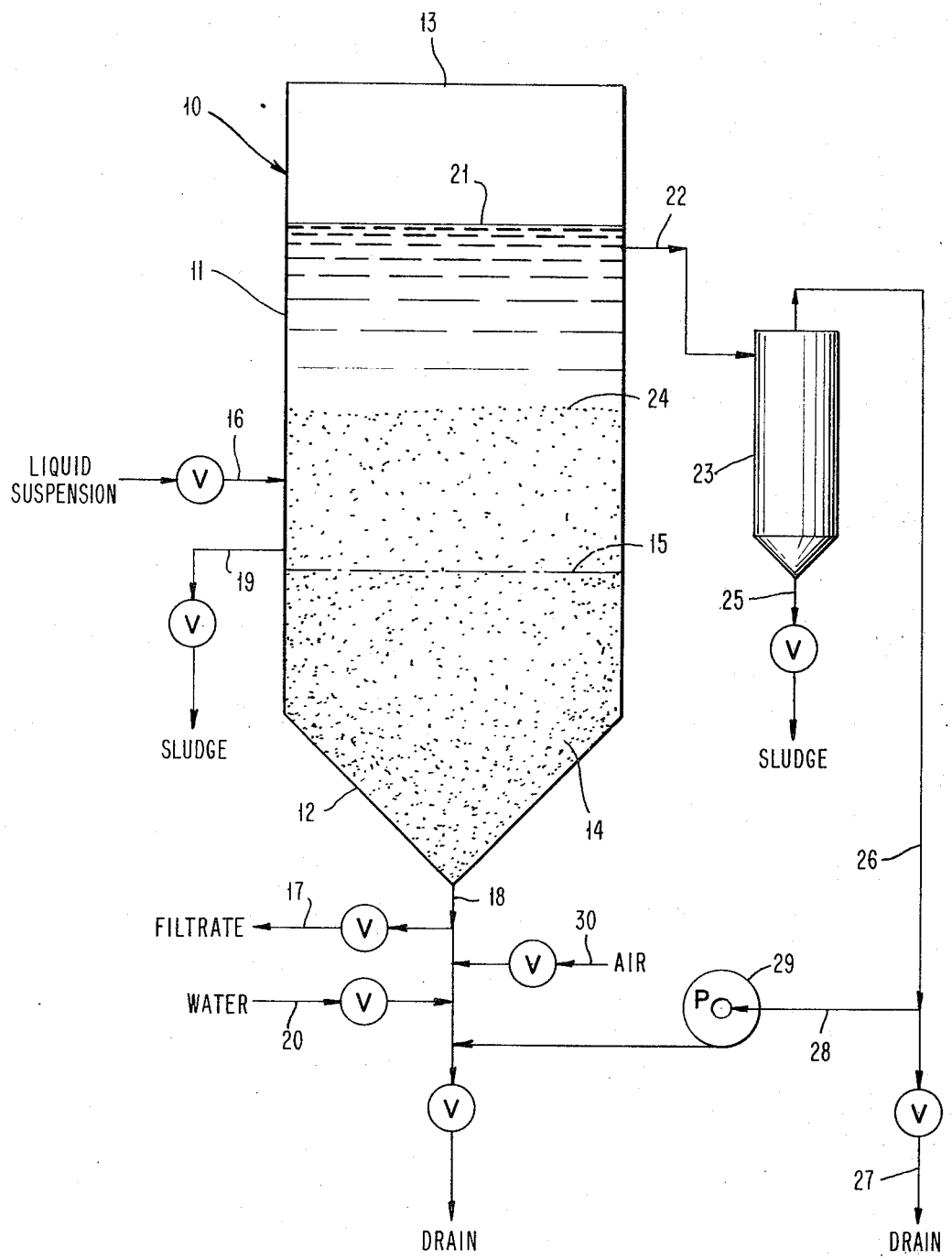

3,846,304
METHOD FOR CLEANING LIQUID FILTER BEDS
Paul W. Garbo, 48 Lester Ave., Freeport, N.Y. 11520
Filed Jan. 20, 1972, Ser. No. 219,268
Int. Cl. B01d 23/24
U.S. Cl. 210—80
7 Claims

ABSTRACT OF THE DISCLOSURE

Turbid liquids are clarified by percolation through bed-type filters such as sand beds. When such filter beds become laden or clogged with deposited matter, the filters are cleaned or cleared by causing in a liquid the random movement of the sand or other solid particles used to from the filter bed. The random movement with countless collisions of the solid particles dislodges matter deposited in the filter bed and this matter is withdrawn with the liquid. The solid particles thus cleaned are permitted to settle and reform a fresh filter bed.

BACKGROUND OF THE INVENTION

A filter bed may be formed of sand, gravel, slag, alumina, granite, feldspar, hematite, coke, anthracite, glass or particles of any hard material which is substantially insoluble in the liquid passed through the filter. Periodically, the filter bed requires cleaning because the deposition of matter removed from the filtered liquid reduces the flow rate of the liquid through the filter and may even cause clogging of the filter.

Many proposals have been made for cleaning filter beds. Usually, reverse flow or backwashing is employed to remove deposited matter from the bed with a wash liquid. For instance, U.S. Pat. 3,613,888 to W. Leslie Harris discloses the cleaning of a filter bed by backwashing with a slow water flow rate and by injecting air into the rising backwash water above the top surface of the bed. This approach, like other prior methods, fails to dislodge some of the deposited matter or sediment which has been trapped deep in the filter bed. Moreover, slimes and other deposits which are adherent to the solid particles forming the filter bed are particularly resistant to removal by backwashing in accordance with prior proposals. Such adherent or sticky deposits are often encountered in the operation of filter beds in waste water or sewage treatment plants.

Accordingly, a principal object of this invention is to provide an improved method of cleaning a filter bed which effectively dislodges deposited matter by causing the solid particles forming the bed to bounce about in an upward flow of liquid.

SUMMARY OF THE INVENTION

In accordance with this invention, a liquid filter bed formed of solid particles is cleaned while submerged in liquid by passing fluid upwardly through the bed under conditions which cause random movement of the solid particles without entrainment in the liquid while deposited matter is dislodged and separated from the solid particles by the liquid. The random and turbulent movement of the solid particles leads to the bouncing and colliding of the solid particles with one another and with the walls of the filter vessel so that a scouring action occurs to enhance the cleaning of the filter even when the deposited matter is sticky or adherent.

The desired random movement of the solid particles of a filter bed in a liquid is achieved by controlling the upward flow rate of the liquid and an injected gas to maintain the particles in a suspended and agitated state without effecting transport of the particles away from the resulting expanded and turbulent mass of particles. In other words, the upflowing liquid does not entrain or carry the solid particles of the filter bed out of the filter vessel. However, the upward flow rate of the liquid is sufficient to suspend and carry away the matter deposited in the filter bed during a previous filtration period.

In cases where the deposited matter tends to adhere to the solid particles forming the filter bed and such matter is decomposable or oxidizable by microorganisms and oxygen, the combined passage of liquid and gas up through the mass of solid particles hastens the cleaning of the filter. Thus, the filter beds of waste water and sewage treatment plants are advantageously cleaned with the combined upflow of water and air.

The solid particles forming the filter bed should have a specific gravity appreciably greater than that of the matter removed by filtration from the turbid liquid so that during the cleaning period the previously deposited matter can be more easily carried away in suspension in a wash liquid while the solid particles of the filter bed remain essentially as a turbulent mass of randomly moving particles. As known, other factors influencing the ease with which deposited matter can be separated from the solid particles of the filter bed by suspension and entrainment in an upflow of liquid are the size and shape of the solid particles relative to the size and shape of the particles of matter deposited during the filtration period. The solid particles of a filter bed may be in the form of chips, beads, pellets, shot and the like, graded in relatively narrow size ranges, such as passing through Sieve No. 8 and retained on Sieve No. 20 of the U.S. Sieve Series. The particles of the filter bed will rarely have a maximum dimension exceeding 10 millimeters. In most cases, the particles will be of a size passing through Sieve No. 3 but retained on Sieve No. 60 of the U.S. Sieve Series.

Generally, a liquid upflow rate of 10 to 100 gallons per minute per square foot of the horizontal surface of the filter bed is selected for the cleaning process of this invention. In some instances, liquid flow rates as high as 150 gallons per minute per square foot of horizontal surface of the filter bed may be used but usually there is little justification for such high liquid flow rates. Preferably, a liquid upflow rate in the range of 20 to 60 gallons per minute is used.

The settled filter bed requiring the removal of sediment or deposited matter undergoes volumetric expansion when, pursuant to this invention, liquid and gas are passed up through the bed to cause turbulence or random movement of the solid particles of the bed. Generally, the expanded volume of the agitated mass of solid particles is at least about 25% greater than the volume of the settled mass. Preferably, the expanded volume of the turbulent mass of solid particles is in the range of about 40% to 60% greater than the volume of the settled mass. Higher volumetric expansions may be used but expanding the volume of the mass of randomly moving solid particles to more than about double the volume of the settled mass is rarely justified. The rate of gas flow up through the mass of solid particles in most cases exceeds 3 standard cubic feet per minute per square foot of horizontal cross-section of the filter bed. Frequently, the gas flow rate is in the range of about 5 to 25 standard cubic feet per minute per square foot of horizontal cross-section of the filter bed.

BRIEF DESCRIPTION OF THE DRAWING

Further clarification of the invention will become evident from the description presented herebelow in connection with the accompanying drawing which is a diagrammatic view of a cross-sectional elevation of a filter vessel holding a filter bed that is cleaned by one preferred embodiment of the invention.

DESCRIPTION OF A PREFERRED EMBODIMENT

Referring to the drawing, filter vessel 10 comprises cylindrical column 11 and conical base 12 attached to the lower end of column 11 while upper end 13 of column 11 is open to the atmosphere. A settled mass of sand 14 fills vessel 10 to level 15 to provide a filter bed. Water from an aeration pond of a sewage treatment plant is pumped into filter vessel 10 through valved line 16 which is positioned above top surface 15 of the sand filter bed. Filtered water is withdrawn through valved line 17 from manifold 18 connected to conical base 12 of vessel 10. During the period of filtration a sediment layer accumulates on surface 15 which slows the rate of filtration. In some cases, this layer may be partially removed as a sludge by periodically opening valved drain line 19 while the valves of lines 16 and 17 are temporarily closed. With or without the optional removal of sludge through line 19, the filter bed in due course becomes sufficiently laden with deposited matter that the filtration rate drops off to a value not justifying continuance of the filtration period. The filtration period is terminated by closing first the valve of line 17 and then the valve of line 16 after the water fills vessel 10 to level 21. Water also fills line 22, cyclone separator 23, lines 26 and 28 and pump 29.

The filter bed of sand 14 is now cleaned by starting pump 29 so that water is circulated through manifold 18 and up into the bed. Simultaneously, compressed air is injected from valved line 30 through manifold 18 into the bottom of vessel 10. The combined flow of water and air up through vessel 10 is controlled to cause volumetric expansion of the filter bed from settled level 15 to new level 24 and random movement of the sand particles. The vigorous bouncing and colliding of the sand particles with one another and with the walls of vessel 10 in the upflowing water dislodges the matter deposited in the filter bed during the filtration period. The thus loosened contaminating matter becomes suspended in the water and is carried away from the turbulent mass of sand by the flowing water up through vessel 10 and out through line 22 into cyclone separator 23 wherein part of the suspended matter is separated from the water as a heavy slurry or sludge draining out of separator 23 through valved line 25. The injected air disperses throughout the water as bubbles which rise and escape from the body of water at its surface 21 and discharge from open end 13 of vessel 10 into the atmosphere.

The water freed of some of the suspended matter leaves separator 23 through line 26 and is recycled through branch line 28, pump 29 and manifold 18 to vessel 10. Fresh or filtered water is added through valved line 20 to compensate for the water draining through valved line 25. After a short initial period, usually about 5 minutes, of such circulation of water with vigorous random movement of the sand, the particles of sand have been scoured and the dirt has been thoroughly dispersed in the water. The water containing the suspended dirt is discarded prior to returning the sand bed to the filtration of water supplied by line 16.

The discard of dirty water is preferably made in a continuously progressive manner by opening valved lines 20 and 27 so that cleaner water, usually filtered water, from line 20 enters the system at the same rate that water with suspended dirt is discarded through line 27. The discard of dirty water can also be carried out by simply opening the valves in manifold 18 and lines 25 and 27 and draining all the water from the system. The same valves are then closed and the system may be filled with water from line 20; this optional filling with water from line 20 is solely to provide some rinsing of the sand bed.

After discarding the dirty water either in the continuously progressive manner or by draining all the water from the system and with or without rinsing the sand bed, all valves are closed except that the valves of lines 16 and 17 are opened to resume the filtration of the water supplied by line 16. During the filtration period, the water level above the sand bed is generally kept in the vicinity of the level at which line 16 enters vessel 10.

It will be understood that conical base 12 is provided at its lower end with a screen capable of preventing the passage of sand particles therethrough and into manifold 18. In fact, the filter vessel need not have a conical base to distribute properly the fluid passed upwardly through the mass of solid particles pursuant to this invention inasmuch as the filter bed may be disposed on a horizontal screen or perforated plate extending across the entire lower cross-section of the filter vessel. A vessel with such a foraminous support for the mass of solid particles is shown in FIG. 2 of applicant's copending application Ser. No. 161,167, filed July 9, 1971, and is provided with a zone below the foraminous support into which zone fluid, i.e., liquid and/or gas, is introduced for distribution and upward passage through the mass of solid particles.

It is well to note that the invention avoids the use of fresh or filtered liquid to start the backwashing of a filer bed that has become loaded with dirt or matter removed from a turbid liquid by filtration. The upward circulation of liquid already in the filter bed or liquid still to be filtered with the vigorous bouncing and colliding of the solid particles of the bed in accordance with this invention generally achieves substantial suspension of the dirt previously deposited in the bed and adherent to the solid particles of the bed in a relatively short period of about 3 to 15 minutes. However, even in such a short period, a large quantity of filtered or fresh liquid would be wasted without the total recirculation of turbid liquid as carried out in the process of the invention. This is a very important departure from, and advantage over, the prior practice of backwashing with filtered or clean liquid.

Once the deposited matter has been satisfactorily loosened and scrubbed from the randomly moving and colliding solid particles, the liquid carrying a heavy suspension of dirt is withdrawn from the filter bed. As already mentioned, the withdrawal of this very dirty liquid can be effected in a continuously progressive way by gradually draining the dirty liquid at a point in the system beyond the top of the filter bed while introducing filtered or clean liquid at a commensurate rate into the filter bed. Alternatively, the system may be totally drained to eliminate the dirty liquid and then refilled with clean liquid. In either case, the filter bed is then ready again for the filtration of the turbid liquid.

The improved backwashing method of the invention is particularly applicable to filter beds having a depth of about 6 to 20 feet; the bed depth is frequently in the range of about 8 to 12 feet.

Other variations and modifications of the invention will be apparent to those skilled in the art without departing from the spirit or scope of the invention. For instance, cyclone separator 23 may be replaced by any known device such as a centrifuge for removing suspended matter from the water leaving vessel 10 through line 22. Accordingly, only such limitations should be imposed on the invention as are set forth in the appended claims.

What is claimed is:

1. In the method of cleaning by backwashing a liquid filter bed formed of solid hard particles having a specific gravity appreciably greater than that of the matter removed from the liquid filtered through said bed, the improvement which comprises initially recycling the liquid to be filtered upwardly through said bed as back washing liquid while passing a gas upwardly through said bed, the combined flow of said liquid and said gas being controlled to cause at least 25% expansion of the settled volume of said bed and vigorous random movement of said solid particles without entrainment of said solid particles in said liquid thereby effecting suspension and entrainment in said liquid of matter previously deposited in said bed, said recycling of said liquid together with suspended and entrained matter being conducted by pumping said liquid from above said bed into the bottom of said bed, partially removing said suspended and entrained matter from said liquid while said liquid is being passed by said pumping from above said bed into the bottom of said bed, and then discarding said liquid in which the remainder of said matter is suspended and entrained prior to resuming the use of said bed for filtration.

2. The method of claim 1 wherein the liquid is recycled upwardly through the filter bed at a rate of at least 10 gallons per minute per square foot of horizontal cross-section of said bed while the gas is passed upwardly through said bed at a rate of at least 3 standard cubic feet per minute per square foot of horizontal cross-section of said bed.

3. The method of claim 1 wherein the liquid is recycled for about 3 to 15 minutes while suspended and entrained matter is being partially removed therefrom by centrifugal force.

4. The method of claim 3 wherein the liquid with the remainder of the suspended and entrained matter is discarded by gradual withdrawal from above the filter bed while liquid substantially free of said suspended and entrained matter is introduced into said bed at a rate commensurate to said withdrawal.

5. The method of claim 1 wherein the solid particles forming the filter bed are in the size range of passing through Sieve No. 3 but retained on Sieve No. 60 and said bed has a settled depth of at least about 6 feet.

6. The method of claim 5 wherein the liquid is recycled upwardly through the filter bed at a rate of 20 to 60 gallons per minute per square foot of horizontal cross-section of said bed and the expansion of the settled volume of said bed is in the range of about 40 to 60%.

7. The method of claim 6 wherein after not more than about 15 minutes of recycling of the liquid said liquid with the remainder of the suspended and entrained matter is discarded by gradual withdrawal from above the filter bed while liquid substantially free of said suspended and entrained matter is introduced into said bed at a rate commensurate to said withdrawal.

References Cited
UNITED STATES PATENTS

| | | | |
|---|---|---|---|
| 3,078,188 | 2/1963 | Assalini | 210—80 X |
| 3,337,454 | 8/1967 | Gruenwald | 210—80 X |
| 3,717,251 | 2/1973 | Hampton | 210—274 X |
| 3,512,649 | 5/1970 | Nebolsine et al. | 210—274 |
| 3,549,012 | 12/1970 | Mackrle | 210—108 |
| 3,695,433 | 10/1972 | Hirs et al. | 210—67 |
| 3,680,701 | 8/1972 | Holca | 210—274 X |

FRANK A. SPEAR, Jr., Primary Examiner

R. H. SPITZER, Assistant Examiner

U.S. Cl. X.R.

210—82